(12) United States Patent
Blau et al.

(10) Patent No.: US 7,712,030 B1
(45) Date of Patent: May 4, 2010

(54) SYSTEM AND METHOD FOR MANAGING MESSAGES AND ANNOTATIONS PRESENTED IN A USER INTERFACE

(75) Inventors: Andrew E. Blau, Toronto (CA); Eduardus A. T. Merks, North York (CA)

(73) Assignee: International Business Machines Corporation, Armonk, NY (US)

( * ) Notice: Subject to any disclaimer, the term of this patent is extended or adjusted under 35 U.S.C. 154(b) by 787 days.

(21) Appl. No.: 09/687,092

(22) Filed: Oct. 12, 2000

(30) Foreign Application Priority Data

Dec. 22, 1999 (CA) .................................. 2293068

(51) Int. Cl.
*G06F 3/00* (2006.01)
*G06F 3/048* (2006.01)

(52) U.S. Cl. .................. 715/705; 715/715; 715/762
(58) Field of Classification Search ................ 345/636, 345/709, 753, 781, 751, 833, 854; 716/17; 715/705, 710–716, 762
See application file for complete search history.

(56) References Cited

U.S. PATENT DOCUMENTS

| | | | |
|---|---|---|---|
| 4,723,209 A * | 2/1988 | Hernandez et al. | 345/636 |
| 4,970,678 A | 11/1990 | Sladowski et al. | 364/900 |
| 5,128,871 A * | 7/1992 | Schmitz | 716/17 |
| 5,165,012 A | 11/1992 | Crandall et al. | 395/100 |
| 5,339,392 A | 8/1994 | Risberg et al. | 395/161 |
| 5,371,675 A * | 12/1994 | Greif et al. | 345/781 |
| 5,600,778 A | 2/1997 | Swanson et al. | 395/333 |
| 5,617,539 A * | 4/1997 | Ludwig et al. | 345/753 |
| 5,644,692 A * | 7/1997 | Eick | 345/833 |
| 5,673,390 A * | 9/1997 | Mueller | 708/104 |
| 5,812,850 A * | 9/1998 | Wimble | 717/131 |
| 5,870,559 A * | 2/1999 | Leshem et al. | 345/854 |
| 6,259,445 B1 * | 7/2001 | Hennum et al. | 345/709 |
| 6,275,223 B1 * | 8/2001 | Hughes | 345/751 |
| 6,418,543 B1 * | 7/2002 | Goli et al. | 714/38 |

* cited by examiner

*Primary Examiner*—Weilun Lo
*Assistant Examiner*—Truc T Chuong
(74) *Attorney, Agent, or Firm*—David A. Mims, Jr.

(57) ABSTRACT

A user may select an error message presented in a graphic user interface and bring up a word processor by which text describing the error and its solution may be entered. This is saved, and the next time the error is encountered, the saved annotation is available for presentation to and further editing by the user. In this manner, the developer may continually improve the quality and usefulness of the error messages.

2 Claims, 23 Drawing Sheets

SYSTEM AND METHOD FOR MANAGING MESSAGES AND ANNOTATIONS PRESENTED IN A USER INTERFACE

BACKGROUND OF THE INVENTION

1. Technical Field of the Invention

This invention pertains to the presentation of annotated messages in a user interface. More particularly, it relates to the presentation, in a graphic user interface, of error messages together with user-supplied annotations.

2. Background Art

During application development with most application development tools (such as those in the IBM VisualAge® line), in most languages (such as C++ and Sun Microsystems, Inc.'s Java™), there comes a point where the developer must compile his or her work. If there are errors in the program, the compile will not be successful and an error message will be issued to diagnose each problem so that the developer will have an idea about what the trouble is, and hopefully, how to fix it.

However, there are literally hundreds of reasons why a compile can fail, and so hundreds of compile errors must be created by the designers and developers of the application development tool. This, coupled with the fact that it is very difficult to anticipate all the situations that might cause a specific compile error, results in ambiguous error messages describing the problem, and virtually no help on how the problem can be solved.

Initially, it might seem that the solution is to devote time to writing better error messages, i.e., ones that more accurately describe the problem and how it might be solved. It is not reasonable to expect that designers and developers of the application development tools will anticipate all the possible scenarios that might result in a compiler error, and then give correct advice on how to correct them. There are simply too many of them.

Programmers who have been working with a particular application development tool, or at least a specific compiler, for an extended period of time, will come to recognize certain error messages, and based on previous experience, know what the likely cause and solution to the problem is. All this information is carried in the developer's mind, even though there may be dozens of different error messages for which this is true. In addition, they may recognize a smaller subset of these messages, and have their own interpretations that are specific to the quirks of a particular project that they are working on.

There is a need for a way to help developers offload their need to remember all the specific interpretations of the compiler error messages.

When a compiler error message is shown to the developer, the developer examines the code and fixes the problem. If the developer has difficulty interpreting the error message, the fix takes longer. Once accomplished, however, the developer makes a mental note about that particular error, and as experience with these messages grows, the fixes take less and less time. This is referred to as coming down the learning curve, and there is a great need in the art to accelerate and shorten that learning curve.

With several developers working in the same environment, it is possible that many may encounter the same error messages. Problems encountered by different developers may share common characteristics, and solutions may be similar. There is a need in the art to facilitate the sharing of experience with respect to these problems and solutions.

A developer may be working with a design application or compiler which provides its messages in a technical language which is unfamiliar, or not sufficiently familiar to enable use, and if translated at all, the translations may be poor. There is a need for a way to provide error messages which are meaningful across language barriers.

It would be advantageous for an the invention to provide an improved system, method, computer program product, a program storage device and an article of manufacture for managing messages presented in a user interface.

It would be advantageous for, an invention to provide user-annotated messages, such as error messages, to application developers.

It would be advantageous for an invention to provide an improved system, method, computer program product, a program storage device and an article of manufacture for presenting error messages in a graphic user interface selectively annotated by users.

It would be advantageous for an invention to provide a way to accelerate the learning curve of developers who must rely on error messages to identify and fix application or compile errors.

It would be advantageous for an invention to provide a way for developers to share experience with error message interpretation and application error solutions.

It would be advantageous for an invention to provide a way for developers to work across language barriers in the interpretation of error messages.

It would be advantageous for an invention to provide a way for developers to come quickly down the learning curve without having to rely on their own memories of error messages and solutions.

SUMMARY OF THE INVENTION

A system and method for managing annotated messages, such as error messages, presented in a graphic user interface. User annotations for the messages displayed are selectively received, associated with the messages, and thereafter displayed to the user together with the messages.

In accordance with an aspect of the invention, there is provided a computer program product configured to be operable for managing messages and associated annotations entered by the user.

There is provided a method for managing messages, comprising the steps of displaying a message to a user; accepting from said user an annotation to said message; associating said annotation with said message; and thereafter selectively displaying said annotation with said message. The above method may be further provided wherein said selectively displaying step further comprises the steps of displaying with said message indicia representing the existence of said annotation; selectively receiving from said user a request to display said annotation; and displaying said annotation with said message. The above methods may also be provided wherein said accepting step further comprises the steps of selectively presenting to said user an edit panel; and receiving from said user said annotation input to said edit panel. The above methods may further comprise the steps of selecting a message from a first file of messages for display to said user; and associating in a second file said annotation to a corresponding message in said first file. There may be further provided the steps of providing message identifying indicia for each message in said first file; generating annotation identifying indicia as a function of said message identifying indicia. Also, there may be further provided the steps of, upon presenting a message from said first file, determining the presence of a corresponding annotation in said second file; responsive to the presence of said corresponding annotation, displaying with said message indicia representing the existence of said annotation; selectively receiving from said user a request to display said annotation; and responsive to receiving the request from said user, displaying said annotation with said message.

The original above method may further comprise the steps of during processing of application code entered by a user, identifying an error in said code; selecting and presenting to said user an error message corresponding to said error; identifying and presenting to said user an annotation corresponding to said error message; and enabling and selectively receiving an annotation and a modified annotation from said user for association with said error message. The above method may further comprise the steps of preserving a history of error messages presented to said user; enabling user selection of an error message from said history of error messages; and selectively receiving from said user an annotation to the error message selected from said history.

All the above methods may further comprise the step of presenting said annotation to other users receiving said message. And certain of the above methods hereinbefore may further comprise the step of enabling access by other users to said second file.

There is also provided a method for managing error messages in a graphic user interface, comprising the steps of selecting and displaying an error message to a user; accepting from said user an annotation to said message; associating said annotation with said message; thereafter selectively displaying said annotation with said message; and presenting an edit panel in said graphic user interface for user entry of new or modified annotations.

Also provided is a system for managing messages at a user interface, comprising means for displaying a message to a user; means for accepting from said user an annotation to said message; means for associating said annotation with said message; and means for selectively displaying said annotation with said message.

There is also provided a system for presenting messages in a user display, comprising a first file for storing a plurality of messages, each said message identified by a message key; a second file for storing a plurality of annotations, each said annotation associated with a corresponding said message; a first event driven control component for selecting from said first file a display message from said first file for presentation in said user display; a second event driven control component for determining the presence in said second file of an annotation associated with said display message; and a third event driven control component for displaying said associated annotation in said user display. The above system may further comprise a fourth control component responsive to entry in said user display of a message annotation to a displayed message, for adding said message annotation to said second file associated with said displayed message. And the above method may further comprise an editor for receiving via an annotation panel in said user display said message annotation.

There is further provided a program storage device readable by a machine, tangibly embodying a program of instructions executable by a machine to perform the method steps for managing messages of any one of the above methods. Also provided is a computer program product or computer program element for managing a message display according to the steps of any one of the above methods. And there is provided articles of manufacture comprising a computer useable medium having computer readable program code means embodied therein for managing messages, the computer readable program means in said article of manufacture comprising computer readable program code means for causing a computer to effect the method steps of the above methods.

Also provided is a computer program product for presenting messages in a user display, comprising a first file for storing a plurality of messages, each said message identified by a message key; a second file for storing a plurality of annotations, each said annotation associated with a corresponding said message; a first event driven control component for selecting from said first file a display message from said first file for presentation in said user display; a second event driven control component for determining the presence in said second file of an annotation associated with said display message; and a third event driven control component for displaying said associated annotation in said user display. The above computer program product may further comprise a fourth control component responsive to entry in said user display of a message annotation to a displayed message, for adding said message annotation to said second file associated with said displayed message.

Other features and advantages of this invention will become apparent from the following detailed description of the presently preferred embodiment of the invention, taken in conjunction with the accompanying drawings.

BRIEF DESCRIPTION OF THE DRAWINGS

The present invention is illustrated by way of example and not limitation in the Figures of the accompanying drawings in which like references indicate similar or corresponding elements and in which.

BEST MODE FOR CARRYING OUT THE INVENTION

In accordance with a preferred embodiment of the invention, a system, method, computer program product, a program storage device and an article of manufacture is provided for enabling an application developer to annotate a message, such as an error message, with additional text describing the message, such as the likely cause of error and its solution.

Normally, a developer makes a mental note about a particular error identified by an error message. With the present invention, the developer is able to click on the error message and bring up a simple word processor by which text describing the cause of the error and its solution may be entered. This is saved, and the next time the error is encountered, the saved annotation is available for presentation to the developer, and to other developers. In this manner, the developer may continually improve the quality and usefulness of the error messages in ways that are specifically meaningful to him or his group.

Error messages that are diagnosing confusing problems may be specific or particular to a certain project. Other developers, particularly those new to the project, having access to the annotated error messages of others benefit from their experience.

Furthermore, the annotations may be recorded in the language of the developer—in his own words. These will be more intelligible and helpful to the developer and to others than, for example, messages in unfamiliar language, or messages that are poorly translated—as is more likely when dealing with the technical languages of application development.

Figure 1:
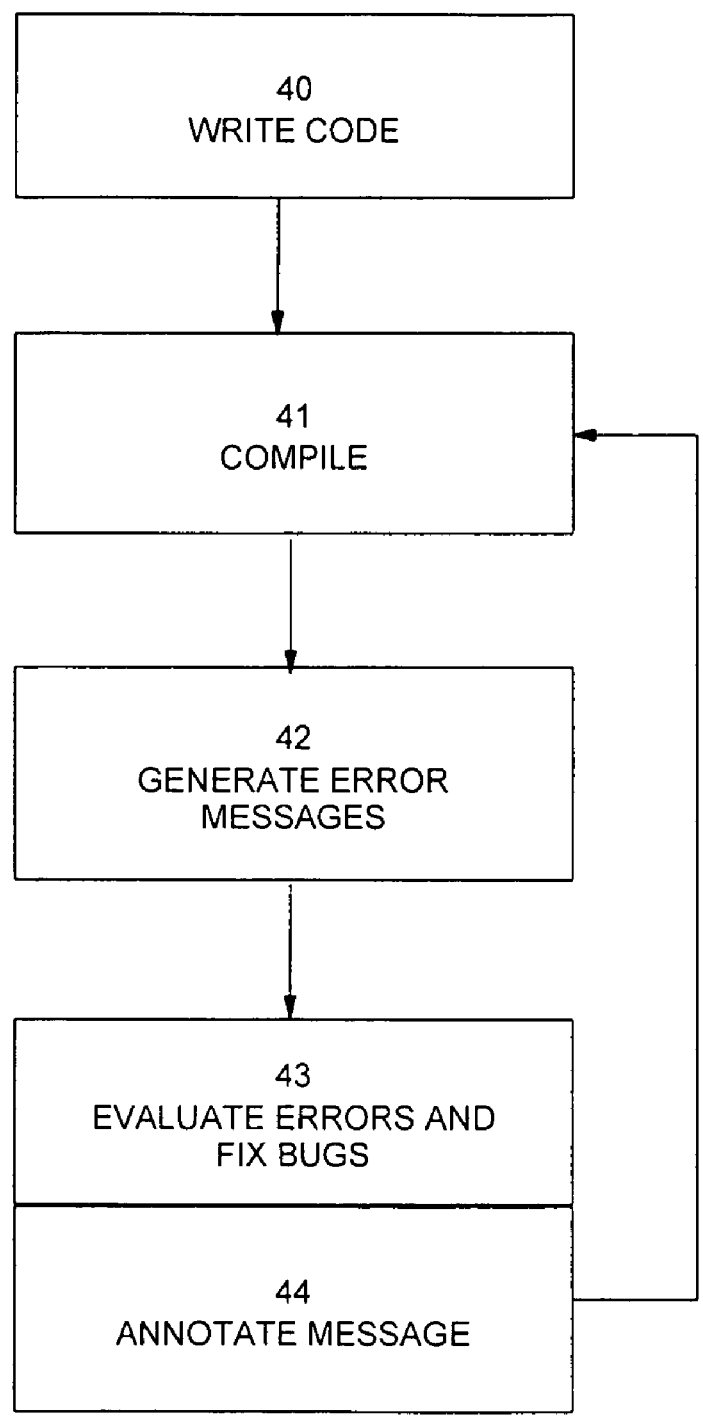
FIG. 1 is a flow chart representation of the application development process of the invention.

Referring to FIG. 1, the normal work flow for an application developer is illustrated. In step 40, the code is written. In step 41, the code is compiled. In step 42, the compiler generates the error messages which, in step 43, the developer evaluates and fixes the errors. This is followed by a recompile, a new pass through the error identification, and correction steps 42 and 43 until the code is error free. By the present invention, the developer is enabled in step 44 to annotate the error messages generated in step 42 with his own text.

When a compiler system hits an error as it works its way through code being compiled, it references the error by an error number which identifies a file of error messages, and the particular message within that file. When the compiler software is translated to a new language (such as French or Hebrew), the file of error messages is translated, but the error numbers stay the same.

To implement a system in accordance with a preferred embodiment of the invention, a second, initially empty, error message file is provided. When a user adds a note to the error message, the note is stored in the second message file, referenced by the appropriate message number. Subsequently, when the compiler encounters the same error, it knows to display the standard error message from the first message file, and then checks to see if there is a user defined message, and if so, displays that one, or a link to it, as well. This way the user cannot corrupt the original error message file, yet can still add to the messages his own annotations. This second message file may be shared with others, including the manufacturer of the application development kit and compiler, for use in interpreting and improving upon the usefulness and clarity of the messages in the first file.

Figure 2:
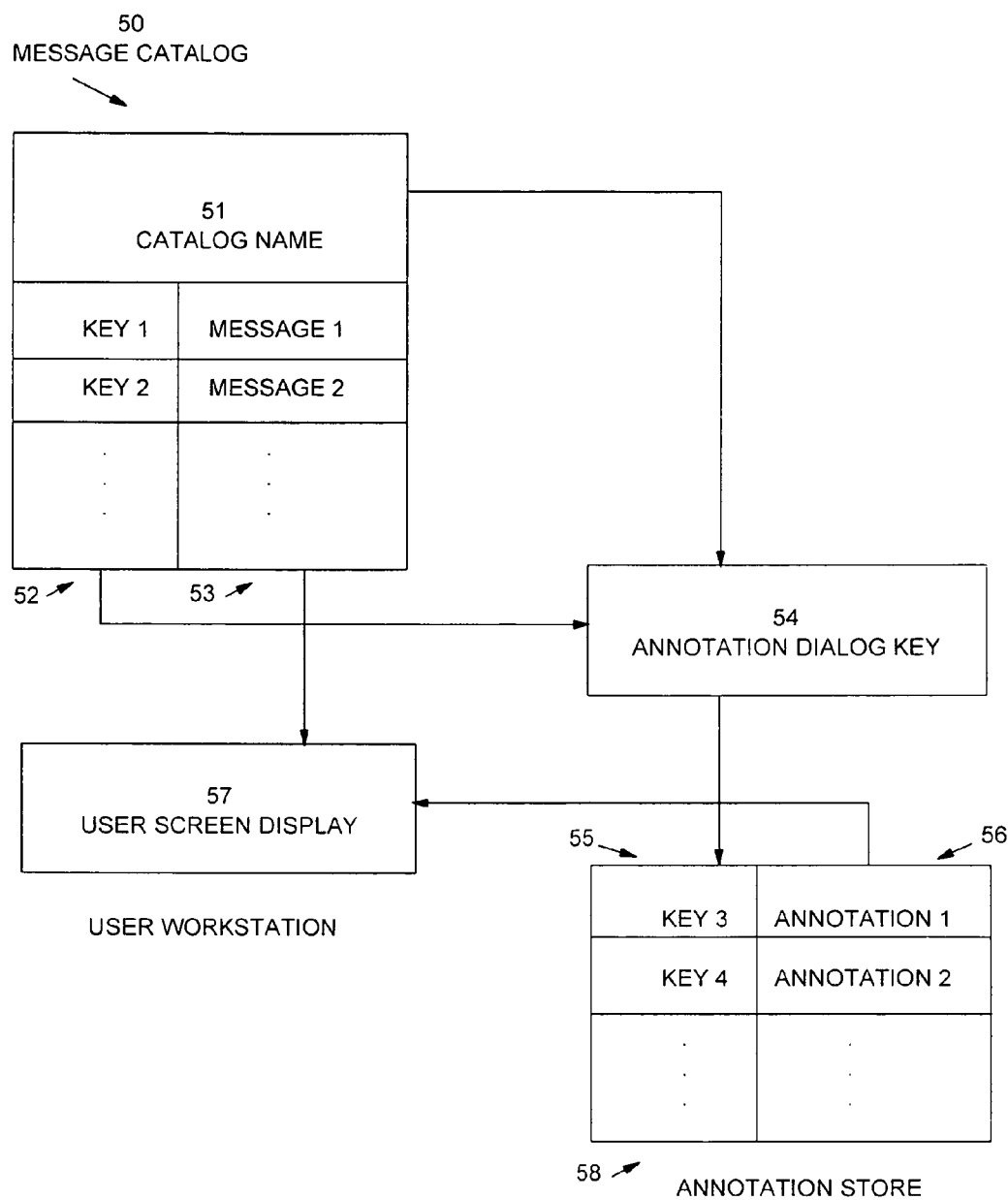
FIG. 2 is a system diagram illustrating the message store and key structure of the invention.

Referring to FIG. 2, error messages 53 are textual material stored in a message catalog 50 of some sort, and identified and accessed by way of message keys 52, for display on a user workstation in a window on a user screen display 57. Message catalog name 51 is combined with message keys 52 to generate annotation dialog keys 54 which are used to access by way of annotation keys 55 the annotations 56 to be combined with messages 53 for presentation to the user on display 57.

A button or menu option on screen 57 is selected to bring up an annotation window, and a text editor provided for enabling the developer to enter his own text. For any particular message then, combining the catalog name 51 and the message key 52 within the catalog gives a unique key 55 for associating information 56 with a particular message 53. There are many ways this can be implemented, such as a file containing key 55/annotation 56 pairs.

Once an error message has been annotated, the next time that error message is displayed, the annotated text is also displayed at the bottom of the message, under a heading such as 'annotation'. Alternatively, underneath the original message an icon of some sort (like the 'twistee' arrow commonly used in Lotus Notes® product for collapsing and expanding) is presented. Selecting (clicking on) this icon expands the error message to show the annotations as well.

In accordance with a preferred embodiment of the invention, annotated error messages are stored in a single, editable text file 58 that defaults as being in read-only mode. For the instance where the developer annotates a message, the file 58 is toggled to read/write, the annotations 56 are added, and then file 58 is changed back to read-only. Thus the resting state of file 58 is read-only. While this makes it possible for developers to access the file to review it and make any changes as necessary, they will have to consciously toggle the file to read/write to do so. This lowers the chance of accidentally damaging or erasing the file.

Since, in this preferred embodiment, all the annotations 56 are stored in a single file 58, this file includes embedded 'hooks', or keys, 55 to each of the numbered error messages 51. By doing so, one developer can copy his or her annotations file to a second user's machine, and then when that user hits an error that has been annotated, he or she will be able to see the first developer's annotations. This allows users working on a common project to share experience.

To enable annotation of error messages with a fix description after a developer finally fixes the error, and the compiler no longer generates and displays the error message, there is added to display 57 a recall button or menu choice by which one or more, such as in a drop down list or window, recent error messages, such as those occurring since the last compile, may be recalled. From this list the developer may select and annotate the error message for which the fix has at last been found.

Figure 3A:
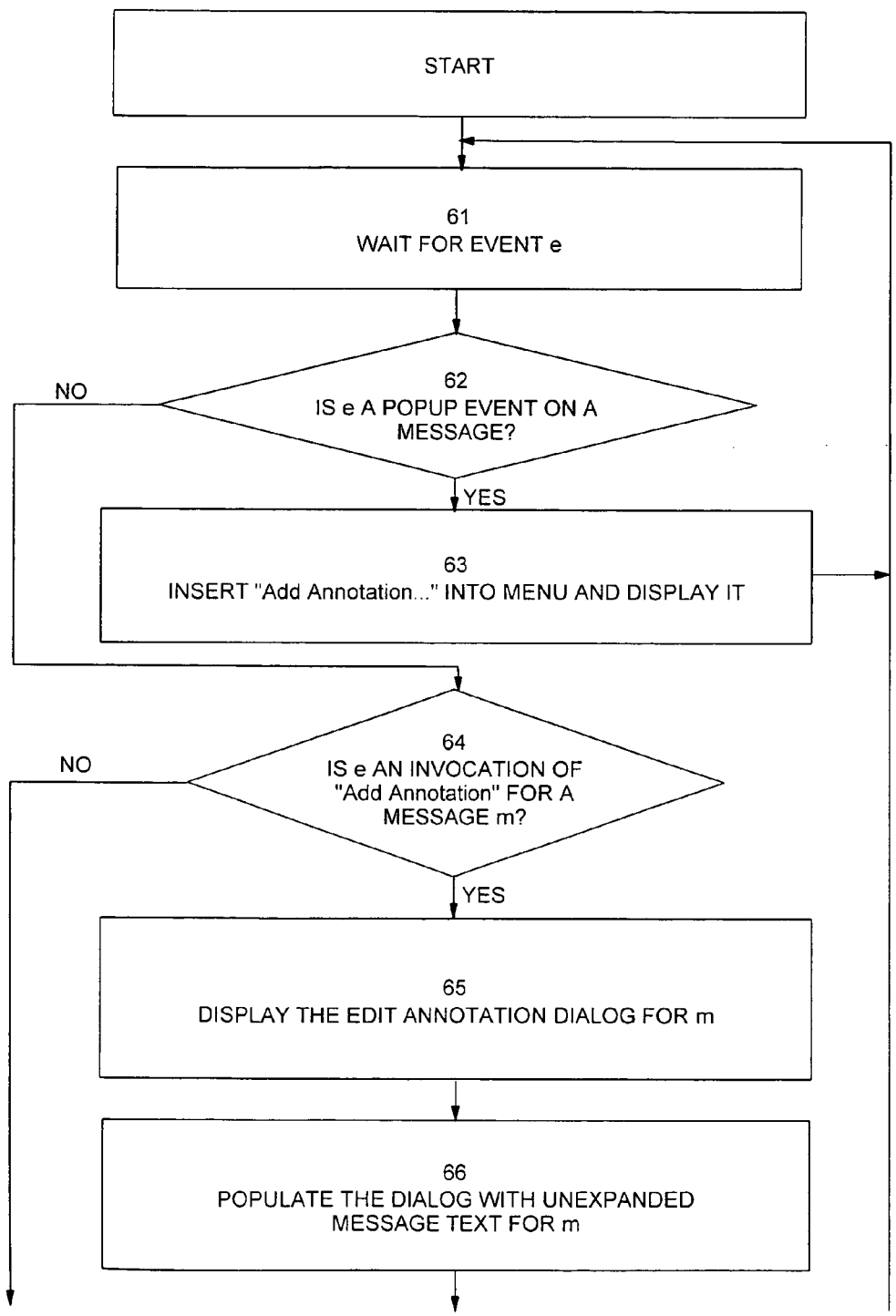
FIGS. 3A-3C are a flow chart representation of the GUI/user interaction process of the invention.
Figure 3B:
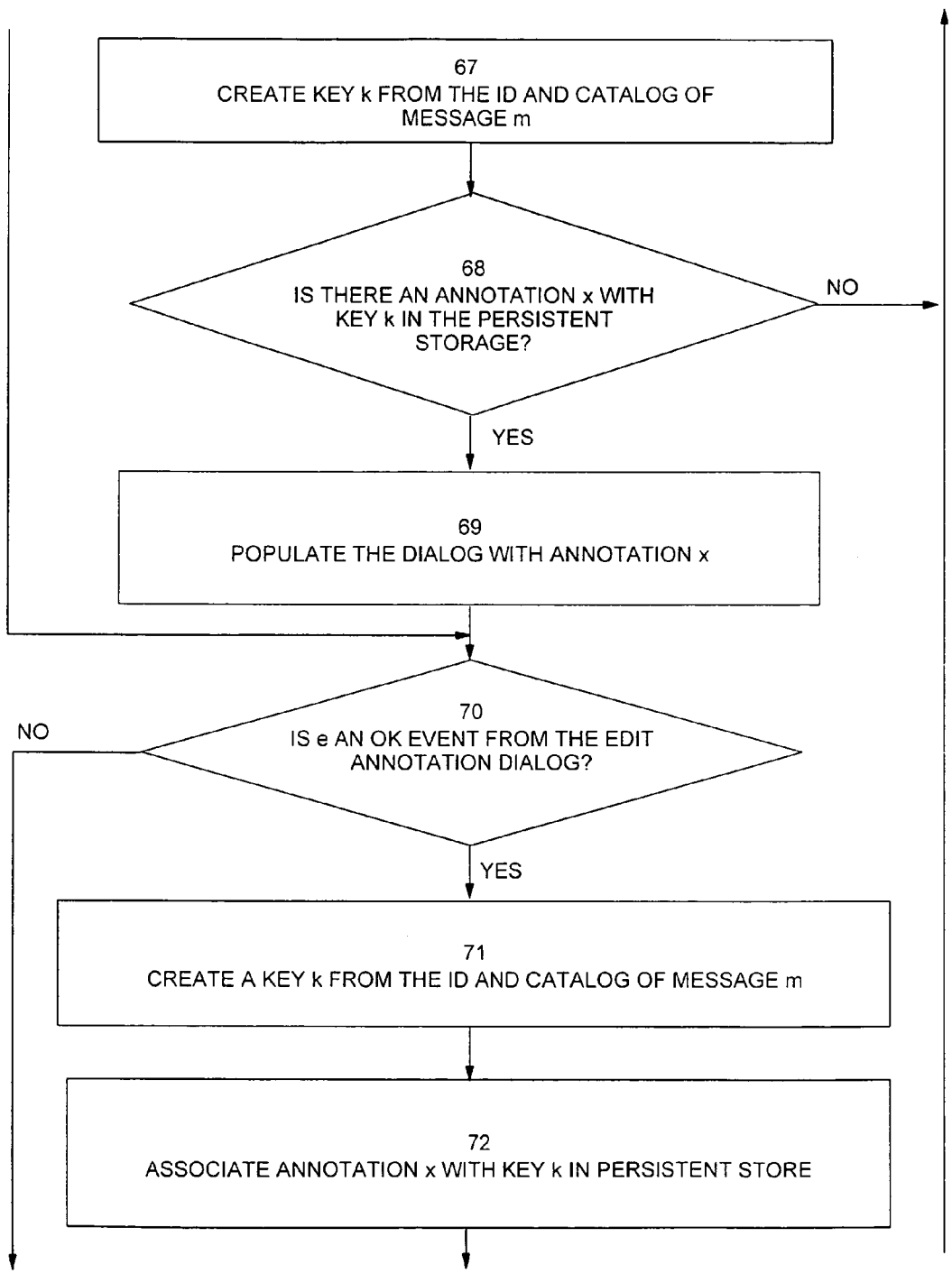
Figure 3C:
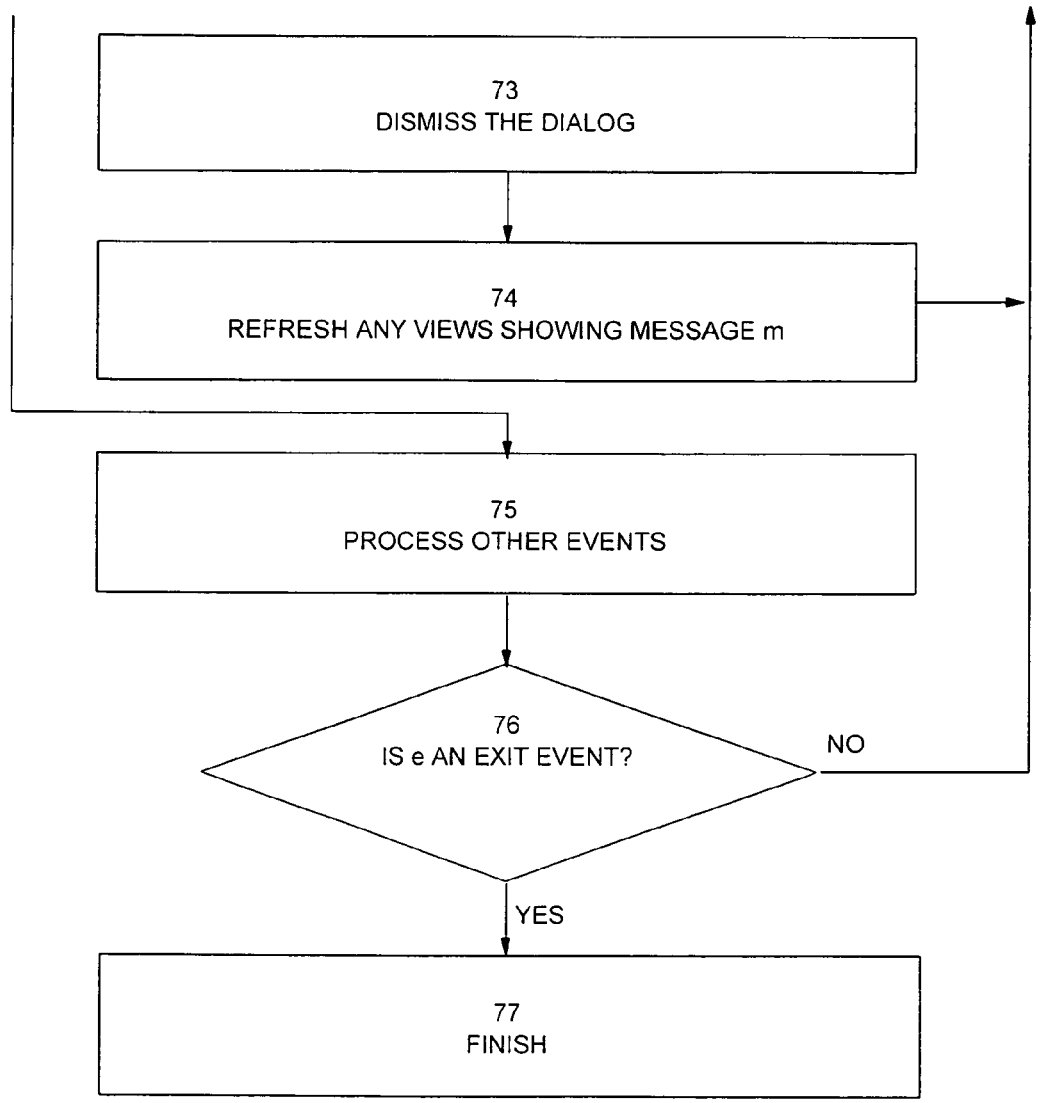
Figure 3C:
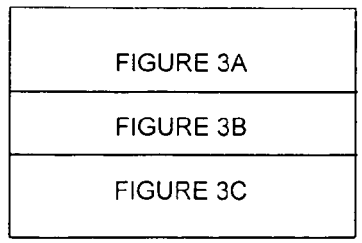

Referring to FIGS. 3A-3C, a flow chart of user interactions with an event driven graphic user interface (GUI) is presented for an exemplary embodiment of the invention. GUIs are event driven, and the flow chart illustrates the processing of those additional events added to a typical GUI to implement the present invention.

In step 61, the GUI code (hereafter referred to simply as the code) waits for an event e. Upon detecting an event, in step the code determines if the event e is a popup event on a message, such as an error message. If so, in step 63 the code adds to the display menu the option to add an annotation, and returns to step 61. If event e is not a pop up event on a message, in step 64 the code determines if the event e is an invocation of the add annotation message inserted at step 63 for a message m, and if not, processing skips to step 70. If e is an add annotation invocation, in step 65 the code displays the edit annotation dialog for m and populates the dialog with the unexpanded message text for m. In step 67 the code creates key k 54 from the identifier key 52 and catalog name 51 of message m 53, and in step 68 determines if there is an annotation x 56 with key k 55 in persistent storage, such as annotation store or file 58. If not, the code returns to step 61 to wait for the next event. If in step 68 an annotation is found to exist, in step 69 the dialog is populated with that annotation x. In step 70, the code determines if event e is an OK event from the annotation dialog and, if not jumps to step 75 to process other events. If step 70 determines that the event is an OK event from the edit annotation dialog, then in step 71 the code creates a key k 54, and in step 72 associates the annotation x with key k 54 in store 58. In step 73 the dialog is dismissed, in step 74 views showing message m are refreshed, and the code returns to step 61 to wait for the next event e. In step 76 the code determines if event e is an exit event, and if so, finishes; and if not, returns to step 61 to await the next event.

Figure 4A:
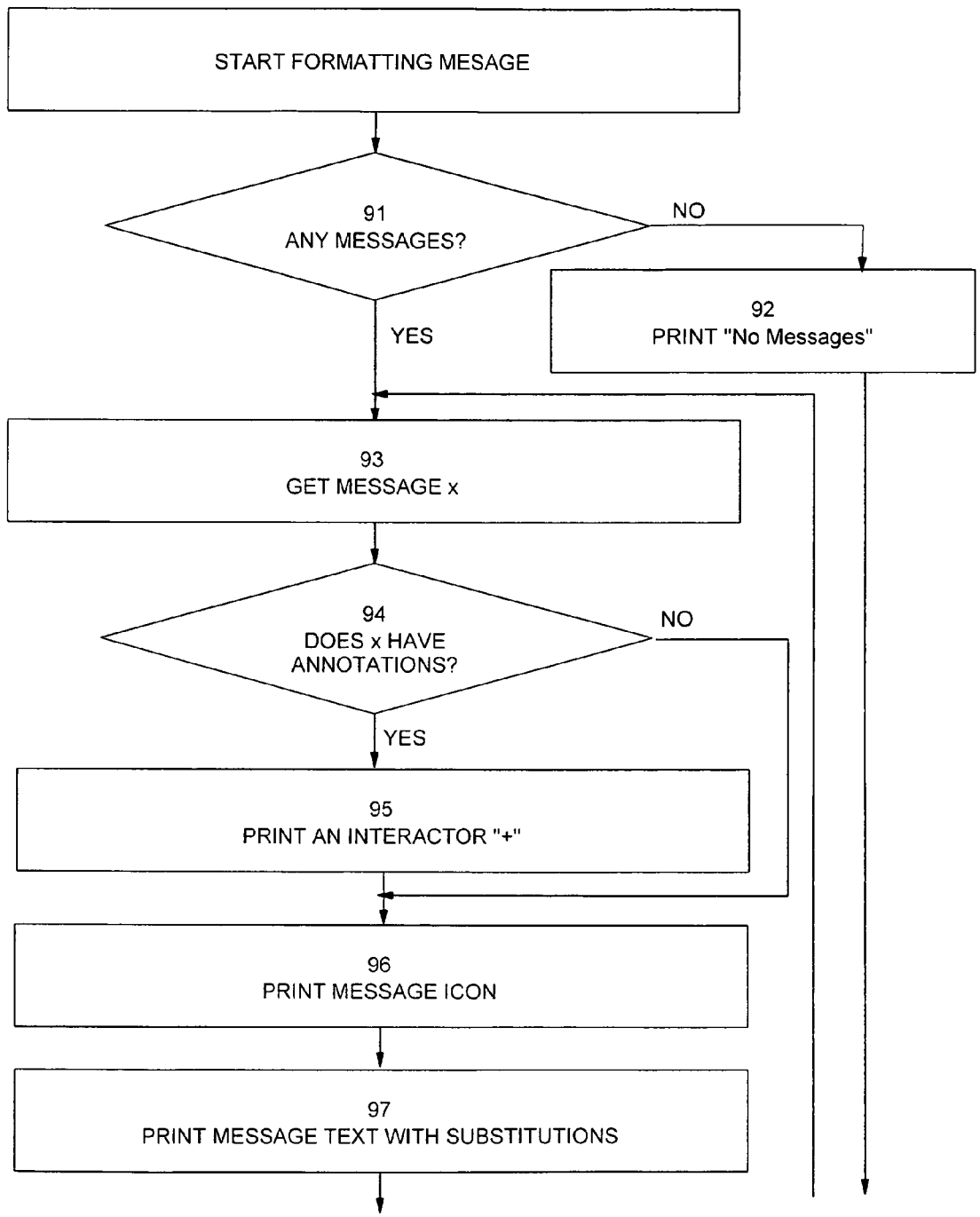
FIGS. 4A-4C are a flow chart representation of the error message format process of the invention.
Figure 4B:
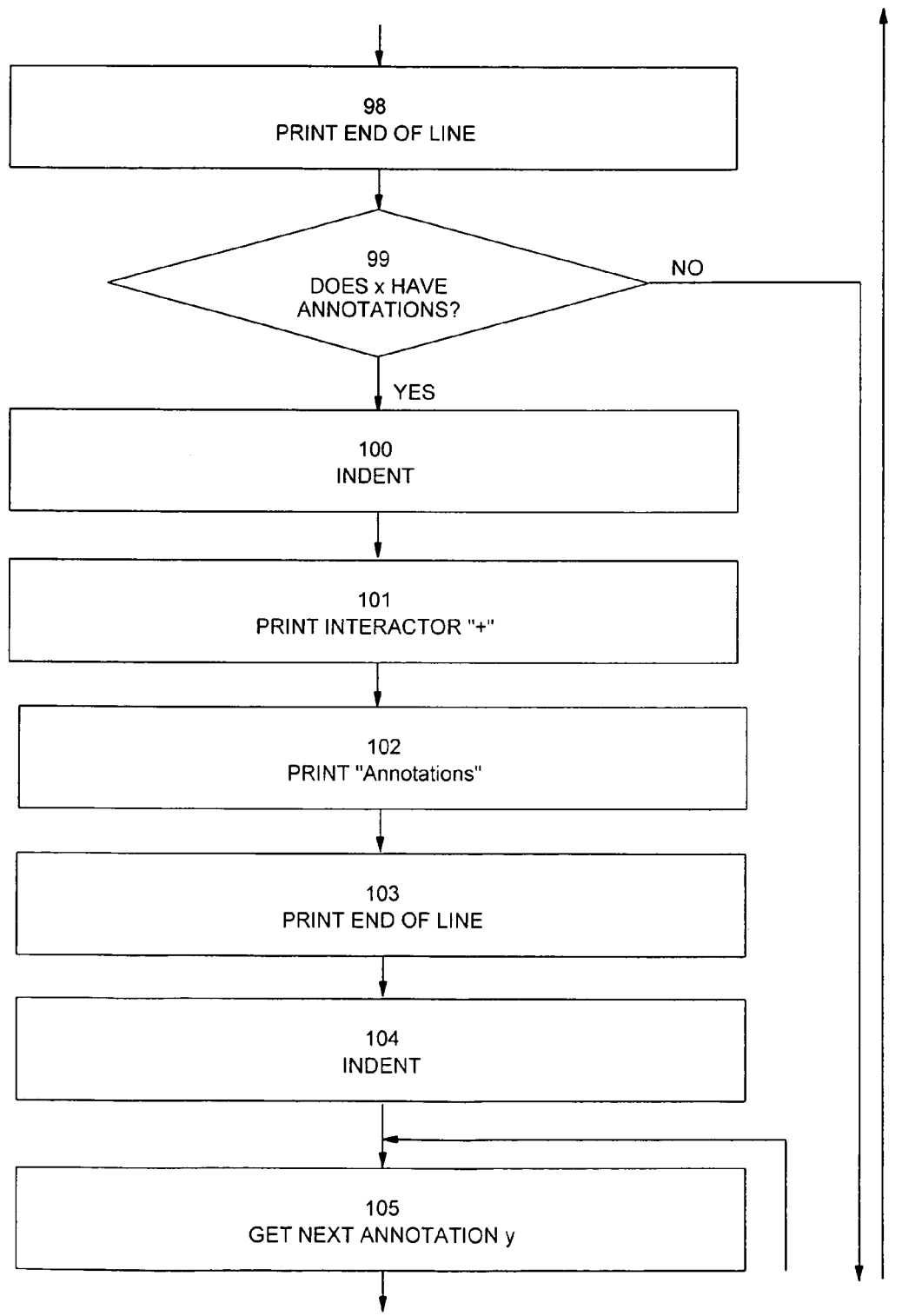
Figure 4C:
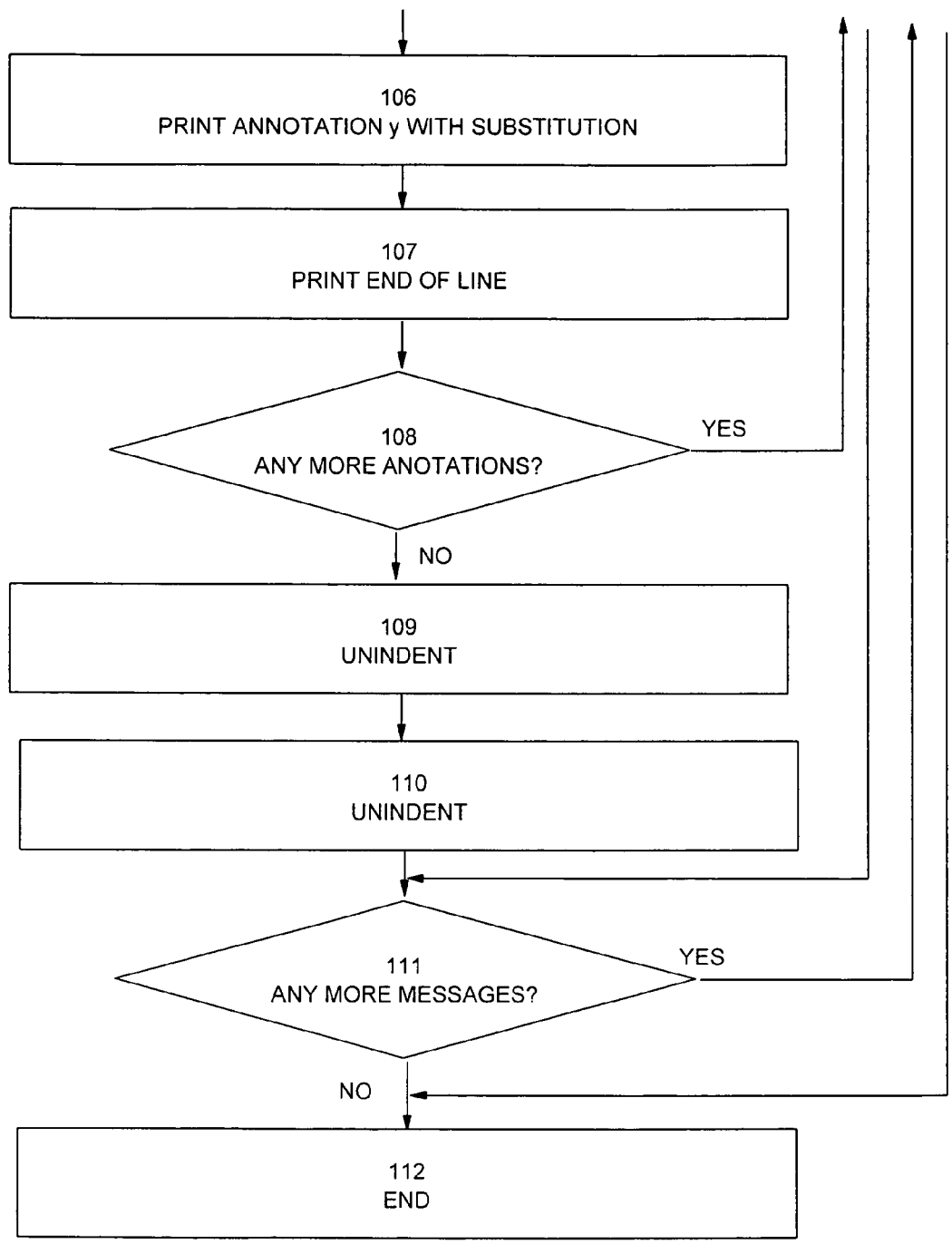
Figure 5:
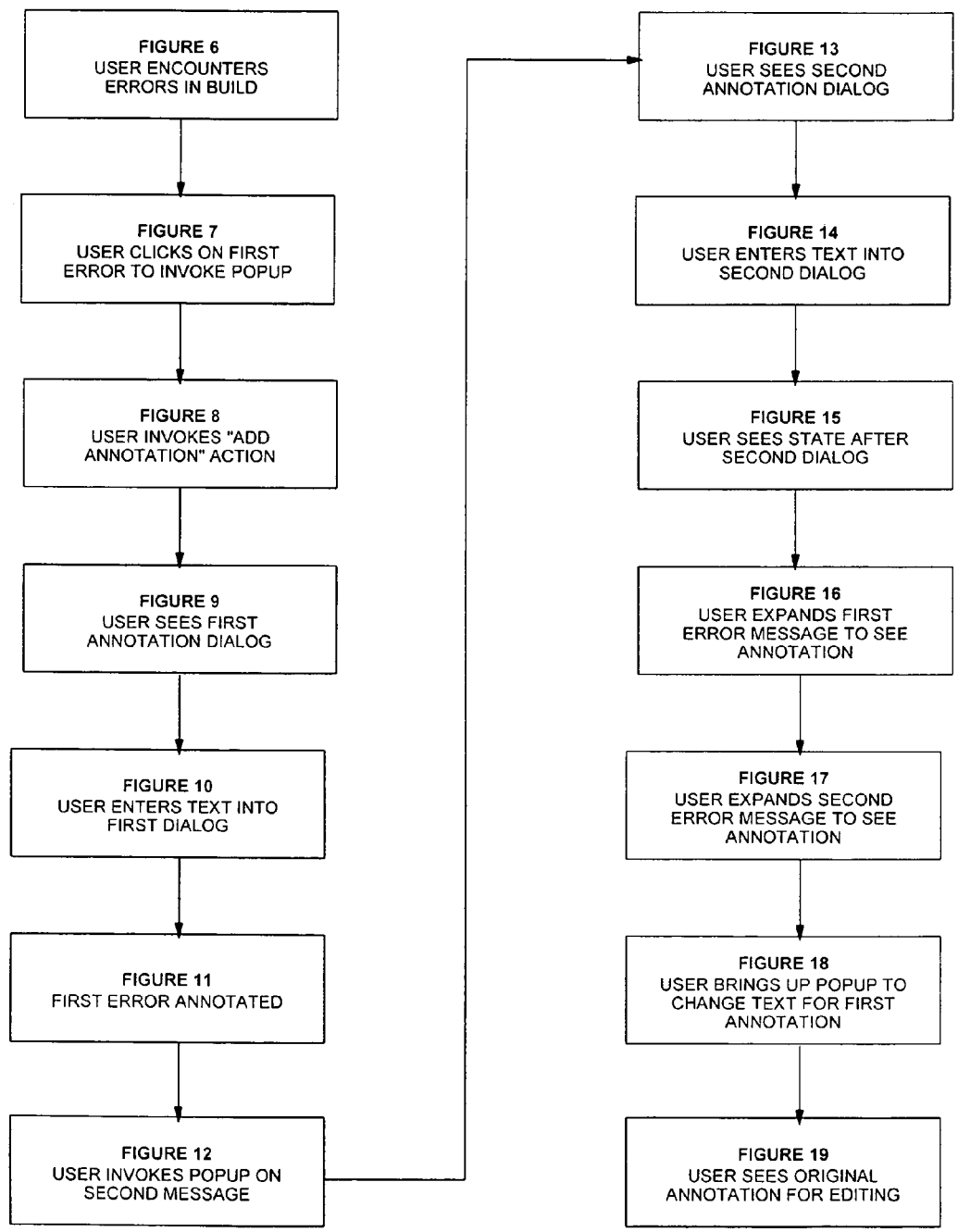
FIG. 5 is an illustration of selected user/GUI interactions enabled by the present invention.

Referring to FIGS. 4A-4C, an exemplary method of the invention for printing messages to display 57 with annotations is set forth. Examples of these display messages are given in FIGS. 5-19. In steps 91 and 92, if no errors have been detected, a message such as "No messages" is presented. If errors have been detected, in step 93 the text of each message x 53 is obtained from store 50, and in step 94 the code determines if message x has associated annotations in store 58. If so, in step 95 an interactor (a control for expanding and collapsing part of the printed display) is printed. In step 96, the message icon is printed to the display, in step 97 the message text is printed, and in step 98 the end of line. If, the test being represented by step 99, message x does not have annotations, step 111 is reached to determine if there are any further messages to process. If message x does have annotations, in steps 100-103 the code indents the display, prints the interactor, prints "Annotations", and prints end of line. In steps 104-107, the code indents the display, gets next annotation y, prints annotation y with substitution, and prints end of line. In step 108, the code determines if there are more annotations for this message, and if so returns to step 105 to get the next one. If not, in steps 109 and 110, the code issues unindents, and in step 111 determines if there are any more messages. If so, processing returns to step 93, and if not processing ends at step 112.

Figure 6:
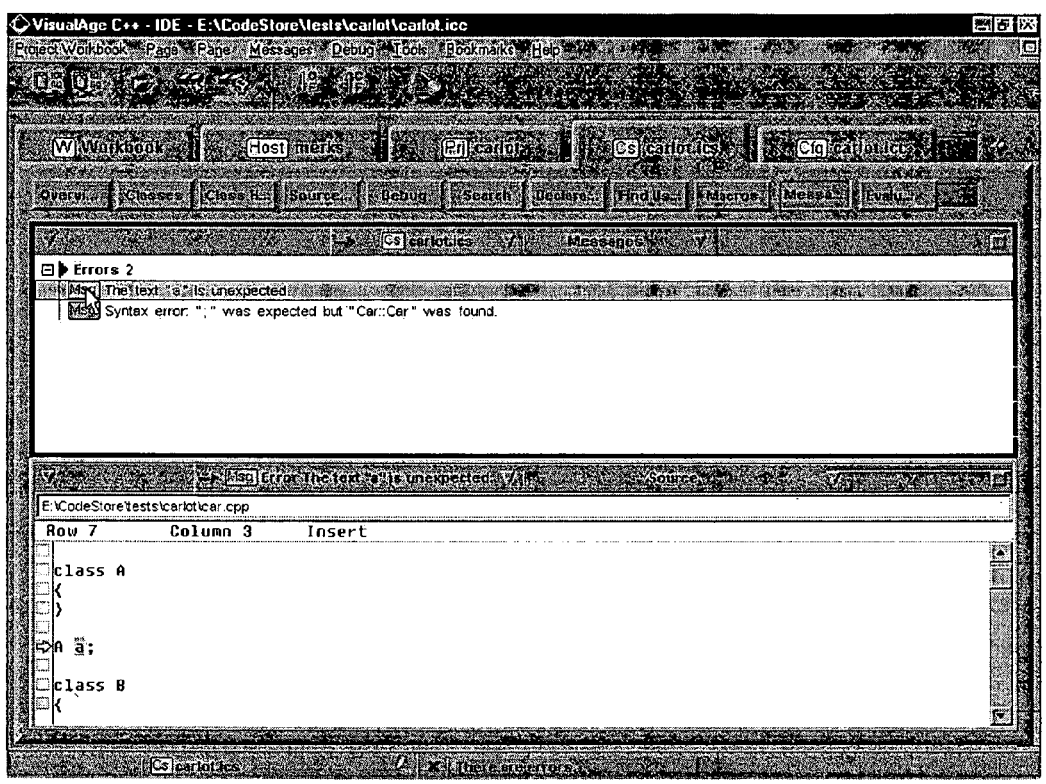
FIGS. 6-19 are screen capture representations of the interactions illustrated in FIG. 5.
Figure 7:
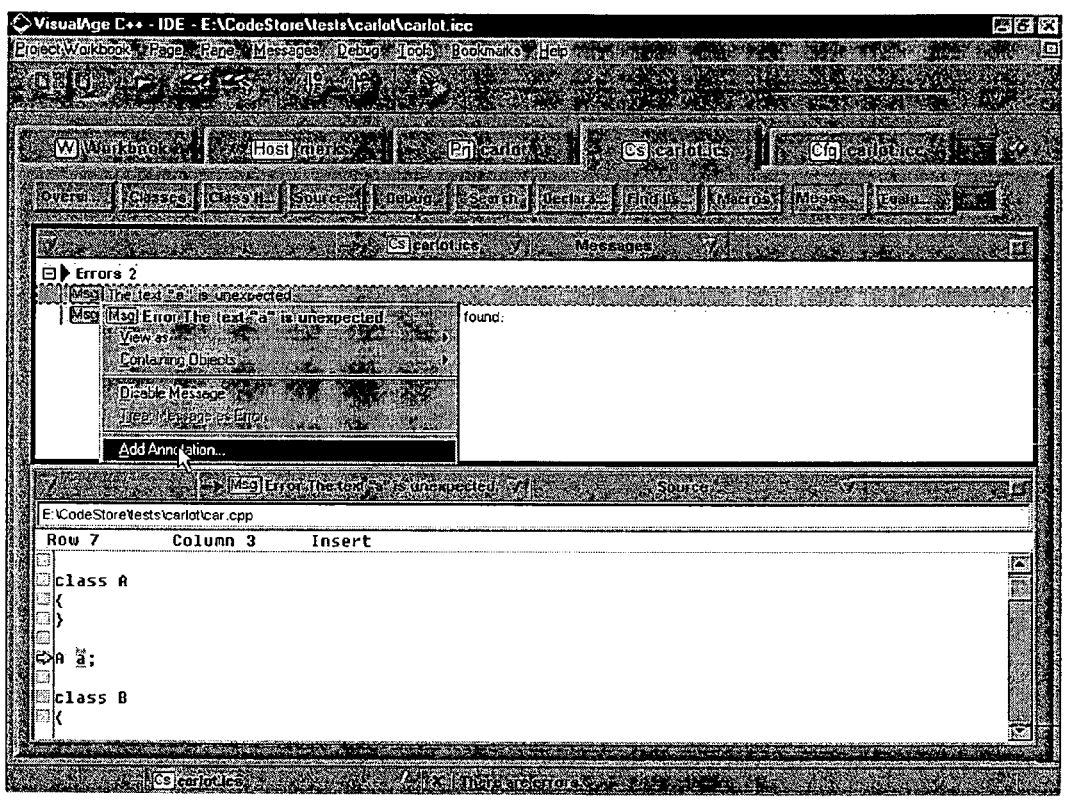
Figure 8:
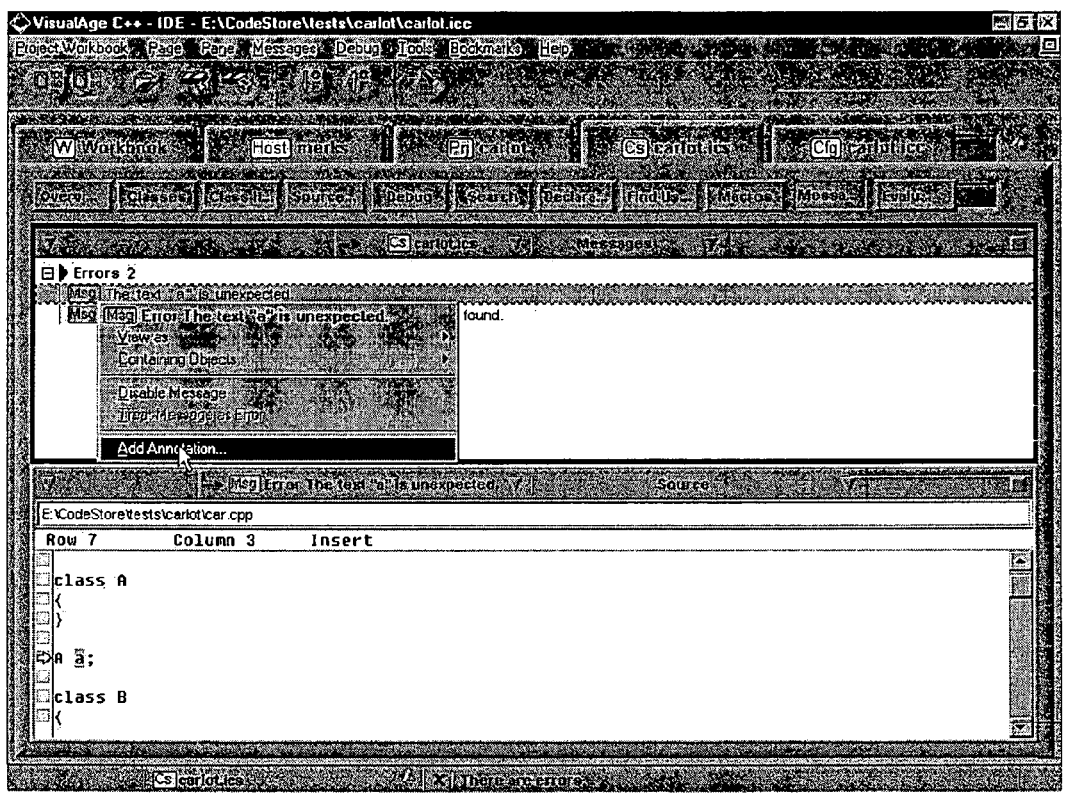
Figure 9:
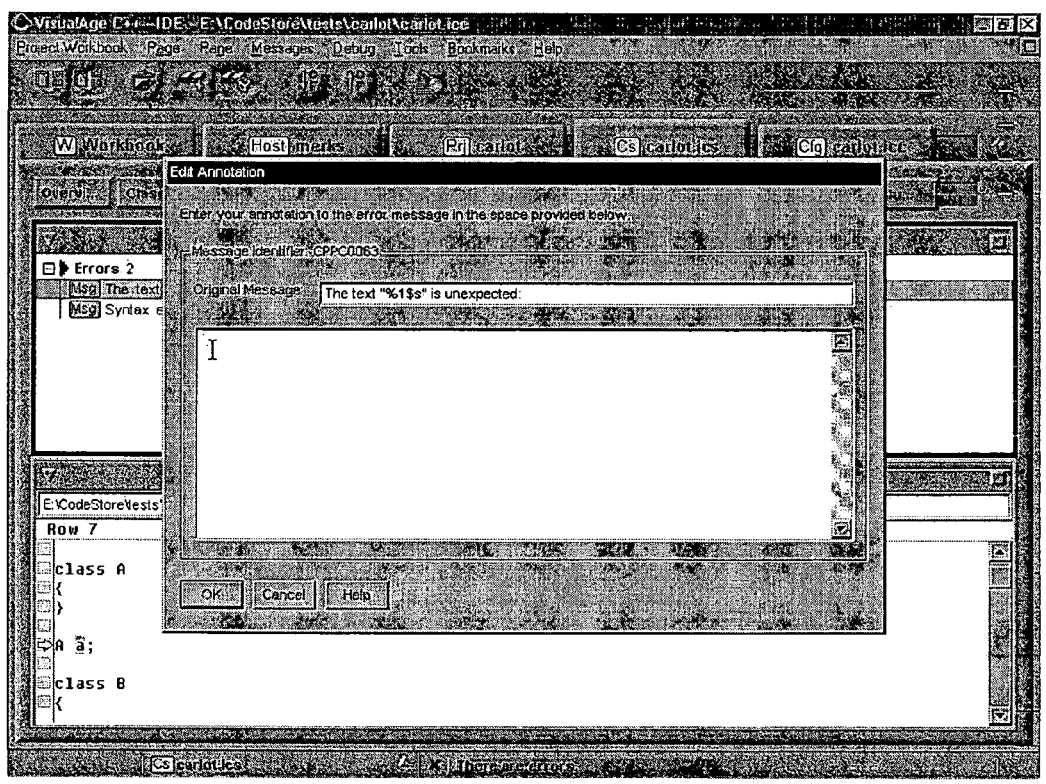
Figure 10:
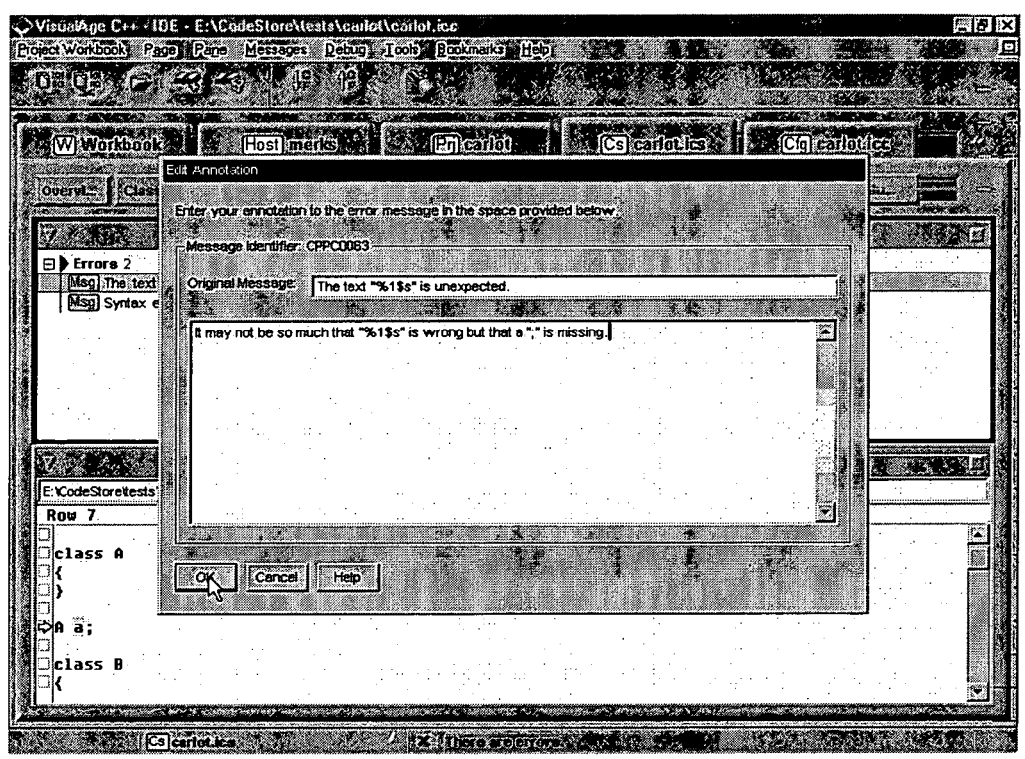
Figure 11:
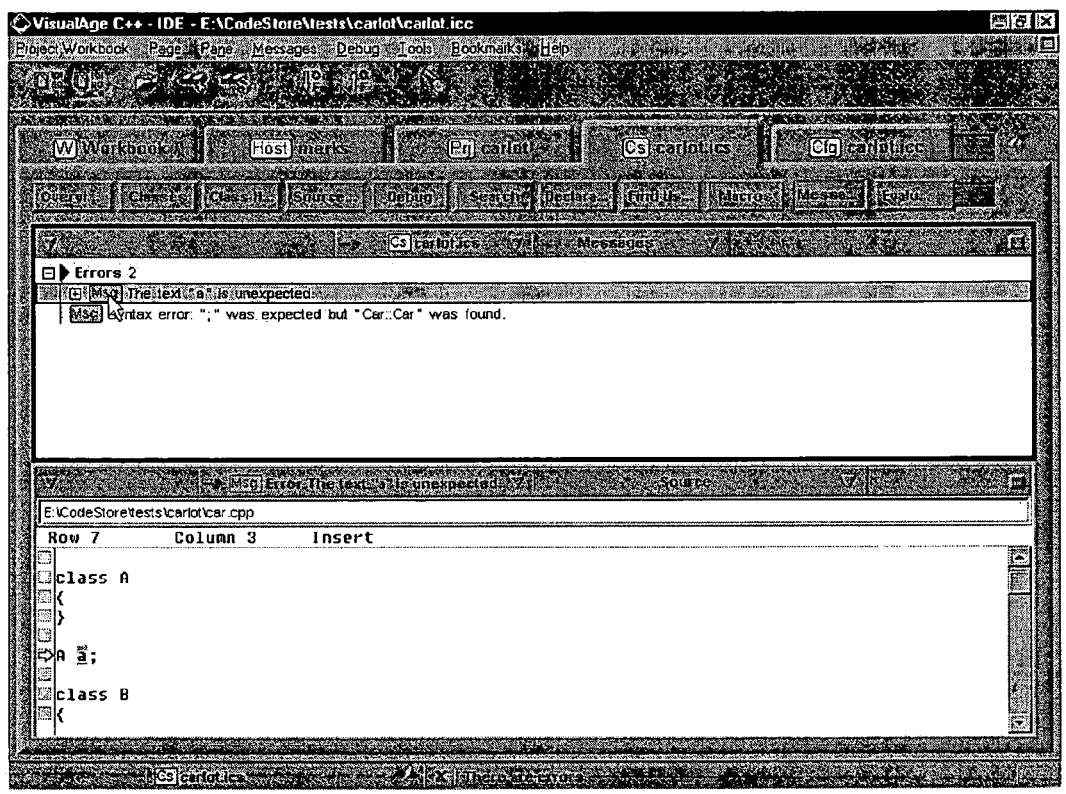
Figure 12:
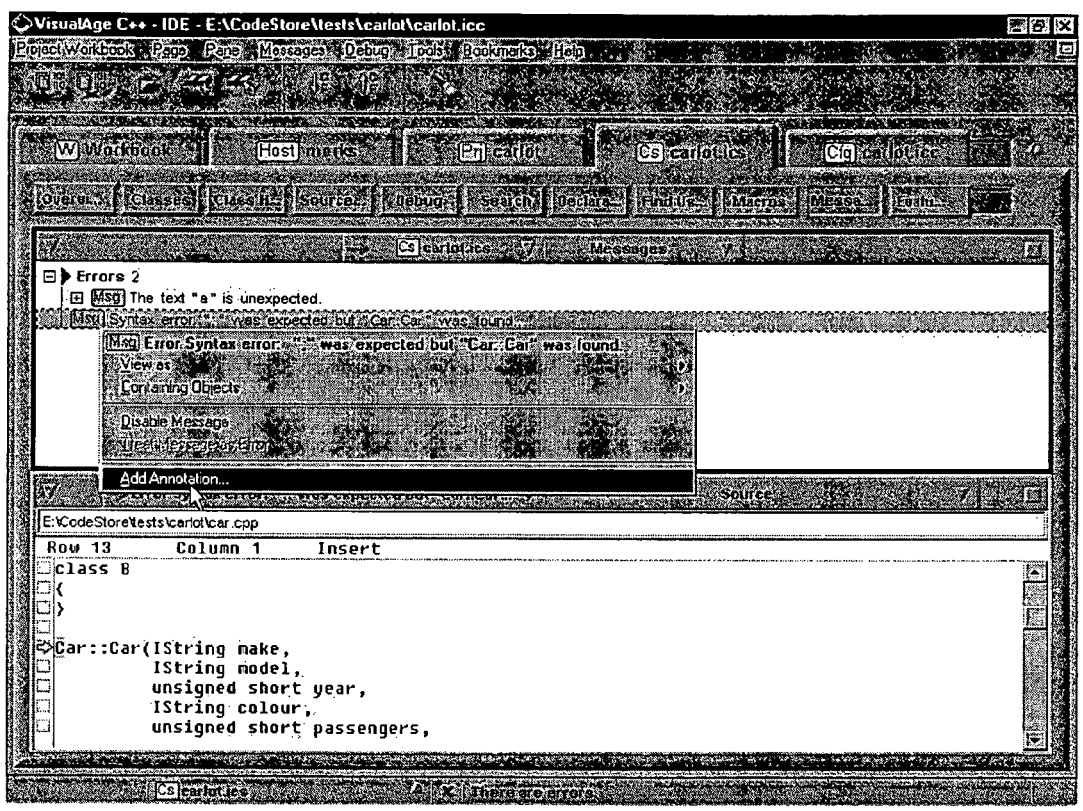
Figure 13:
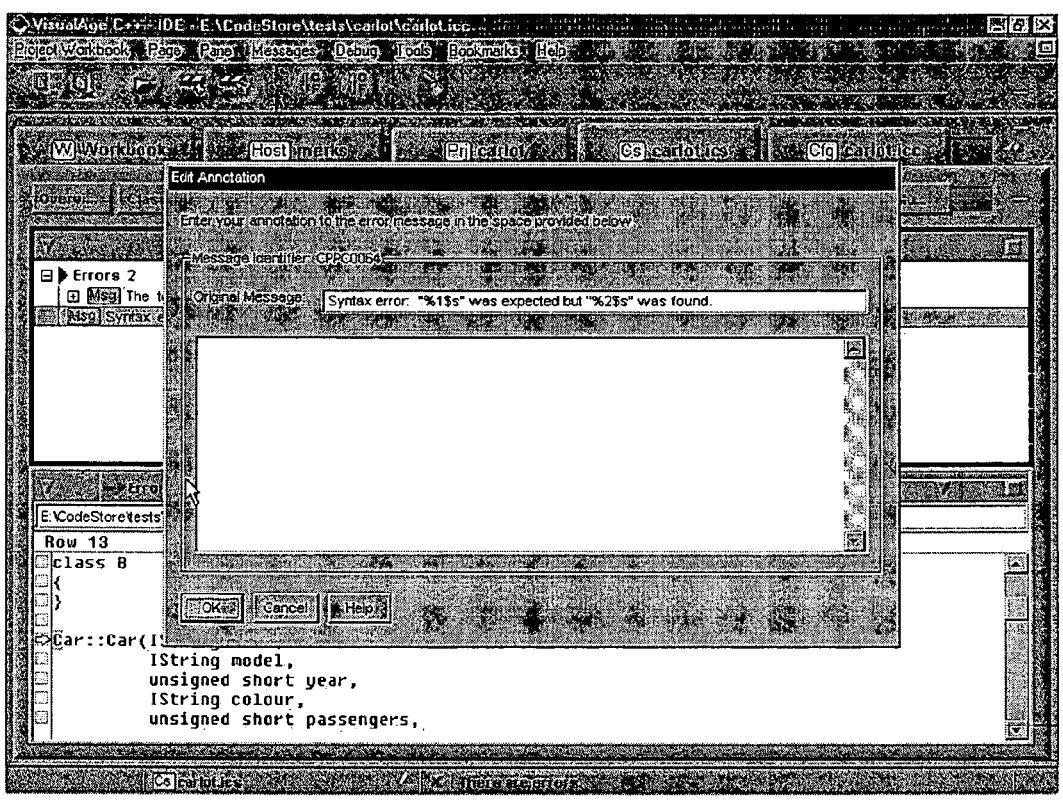
Figure 14:
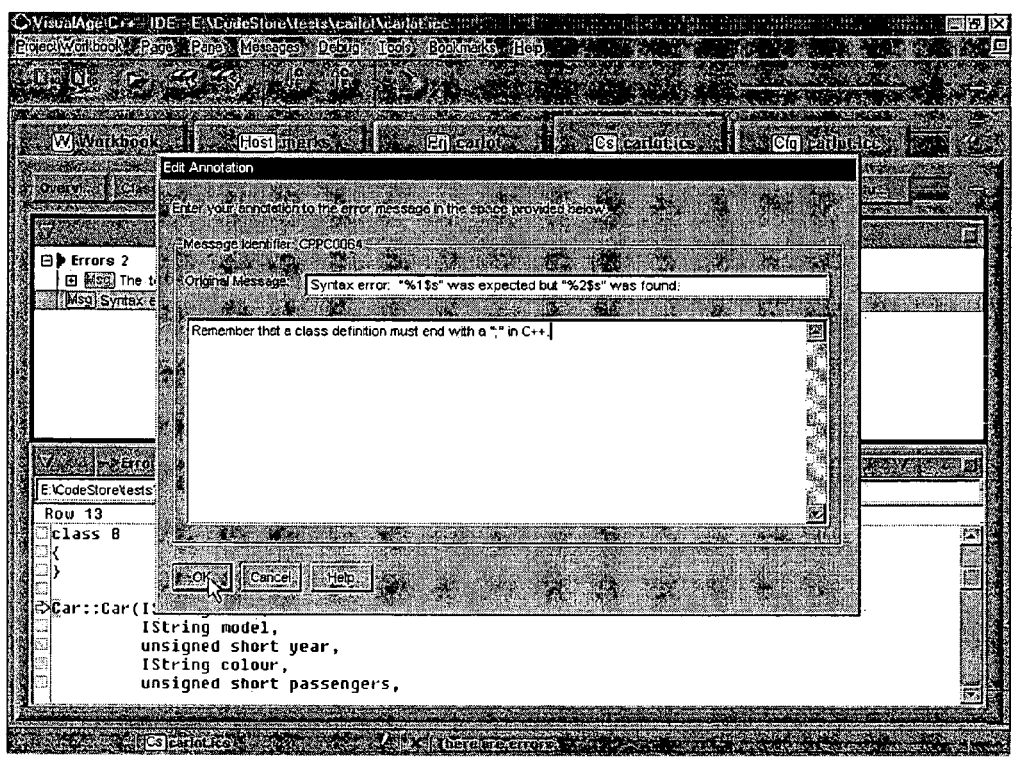
Figure 15:
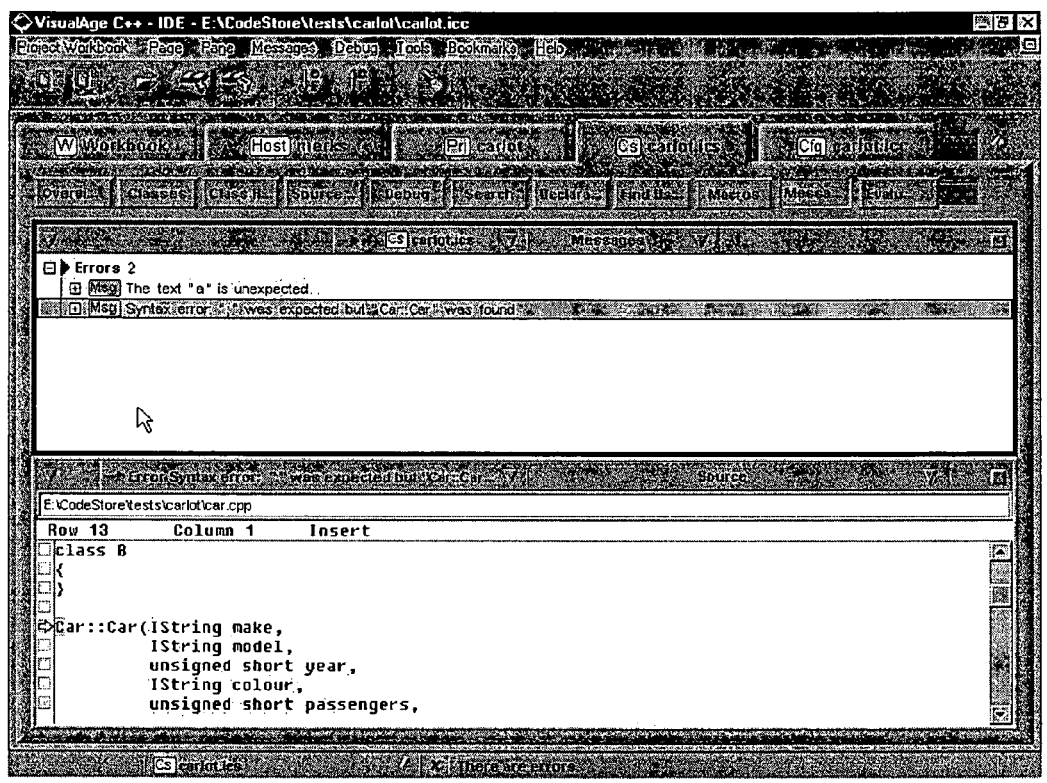
Figure 16:
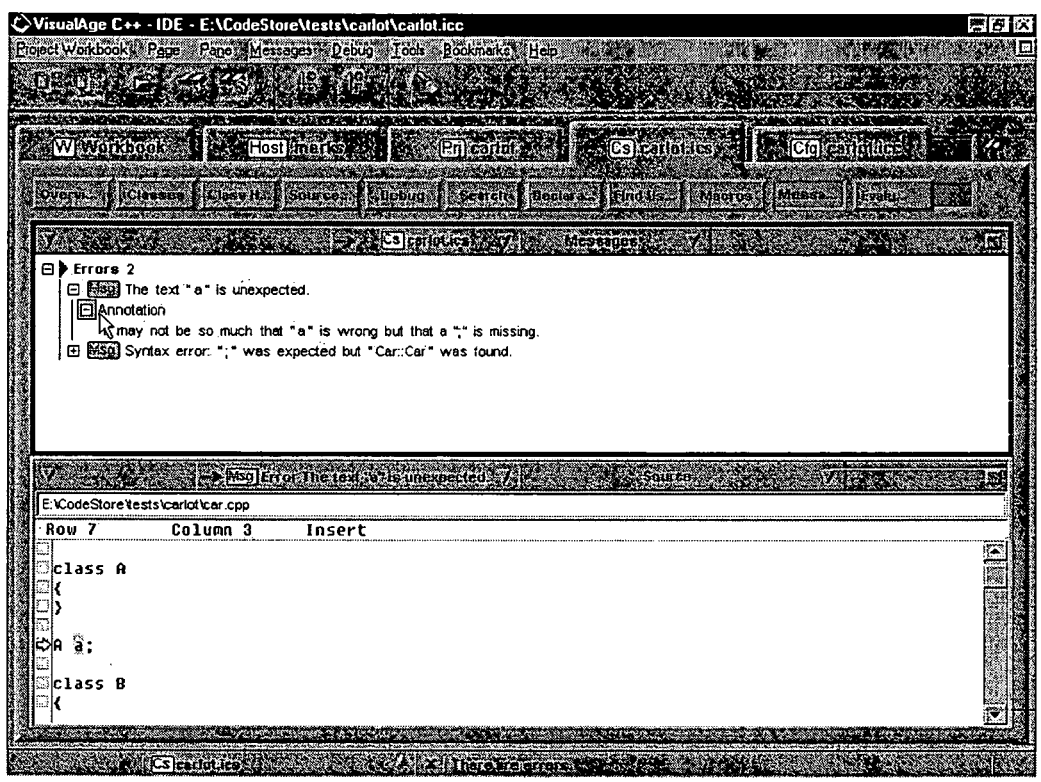
Figure 17:
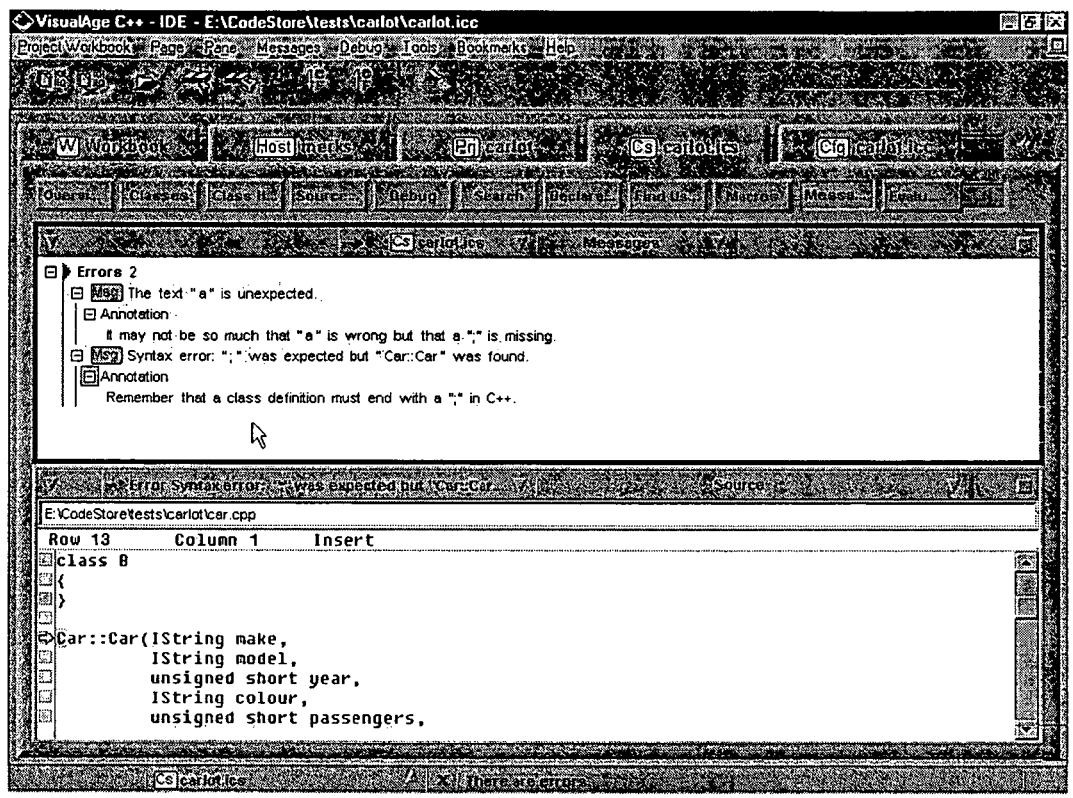
Figure 18:
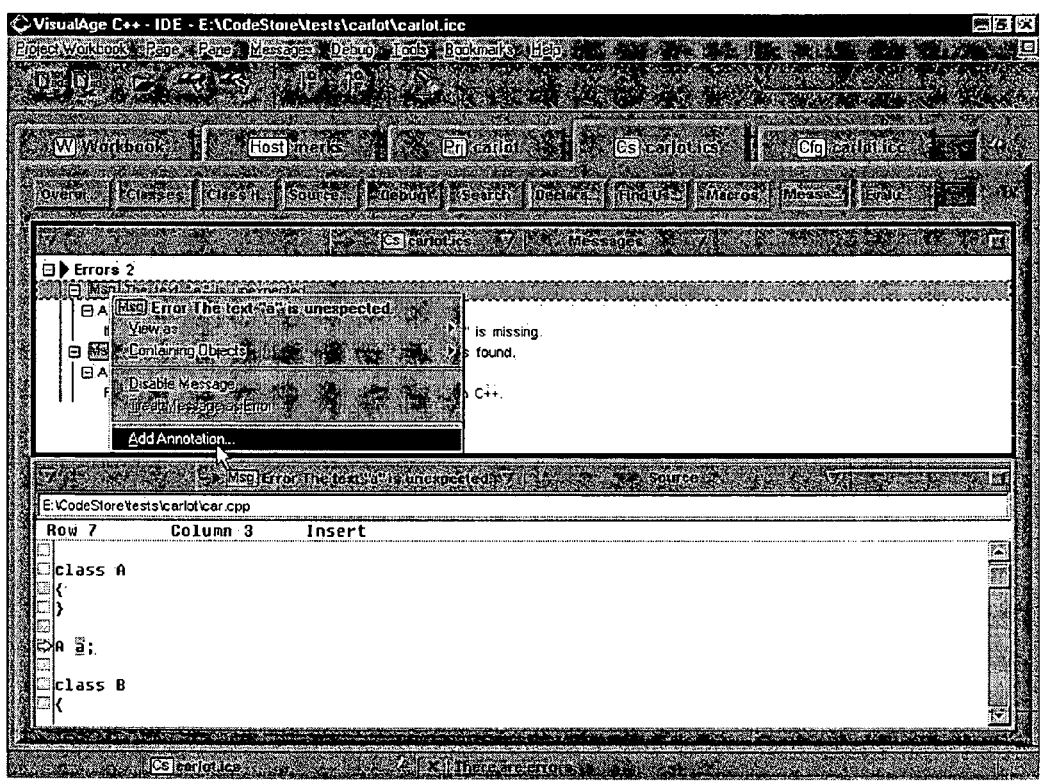
Figure 19:
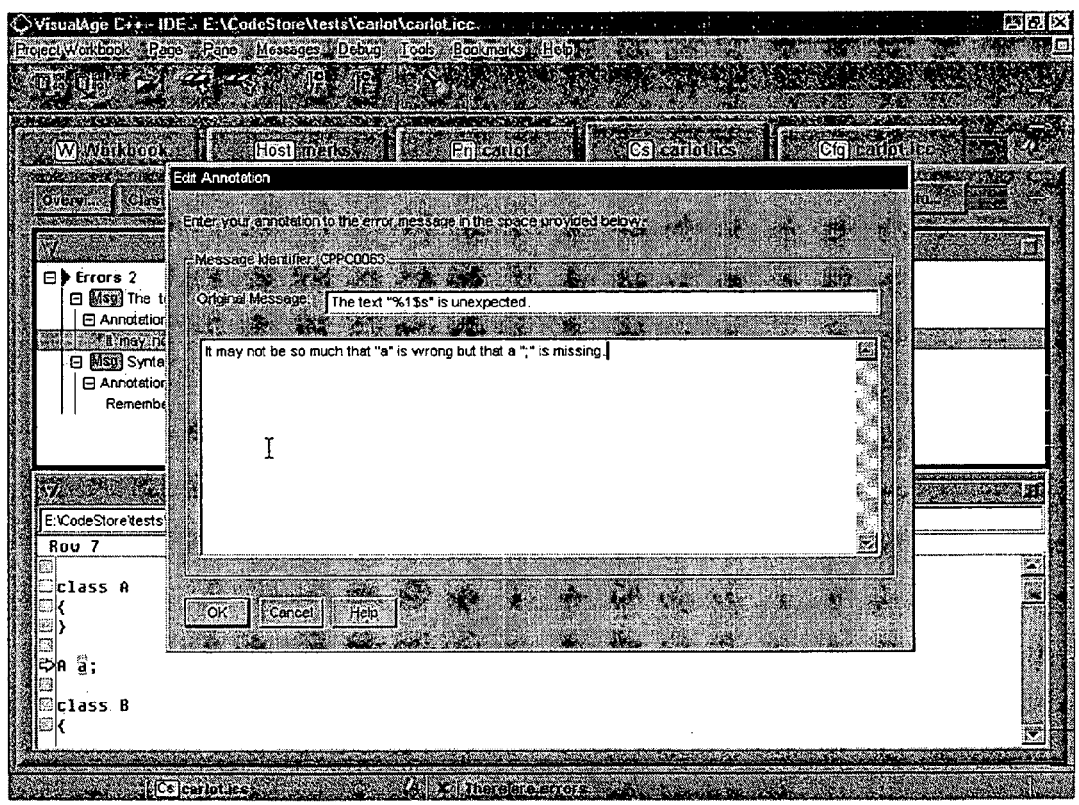

Referring to FIGS. 5-19, a series of GUI screen captures are represented which illustrates several points in the process of error message annotation. In FIG. 6, the user encounters an error in the build. In FIG. 7, the user right clicks on an error to invoke the popup. In FIG. 8, the user invokes the add annotation action. In FIG. 9, the user is presented the annotation dialog. In FIG. 10, the user enters text into the dialog. The user has now finished adding the annotation, and FIG. 11 represents what the screen looks like this time, and any other time this error occurs. In FIG. 12, the user invokes the popup on the second error message. In FIG. 13, the user is presented a second dialog. In FIG. 14, the user enters text into the second dialog. In FIG. 15, the user sees the state of the display after the second dialog. In FIG. 16, the user expands the first error message to see its annotation. In FIG. 17, the user expands the second error message to see its annotation. In FIG. 18, the user, now wanting to change the text for the first annotation, brings up the popup. This will bring up an edit annotation popup similar to that of FIG. 19, enabling the user to further edit the annotation text.

The detailed descriptions may have been presented in terms of program procedures executed on a computer or network of computers. These procedural descriptions and representations are the means used by those skilled in the art to most effectively convey the substance of their work to others skilled in the art. They may be implemented in hardware or software, or a combination of the two.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, objects, attributes or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or similar devices.

Each step of the method may be executed on any general computer, such as a mainframe computer, personal computer or the like and pursuant to one or more, or a part of one or more, program modules or objects generated from any programming language, such as C++, Java, Fortran or the like. And still further, each step, or a file or object or the like implementing each step, may be executed by special purpose hardware or a circuit module designed for that purpose.

In the case of diagrams depicted herein, they are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the description herein may refer to interactions with the user interface by way of, for example, computer mouse operation, it will be understood that within the present invention the user is provided with the ability to interact with these graphical representations by any known computer interface mechanisms, including without limitation pointing devices such as computer mouses or trackballs, joysticks, touch screen or light pen implementations or by voice recognition interaction with the computer system.

The invention is preferably implemented in a high level procedural or object-oriented programming language to communicate with a computer. However, the invention can be implemented in assembly or machine language, if desired. In any case, the language may be a compiled or interpreted language.

The invention may be implemented as an article of manufacture comprising a computer usable medium having computer readable program code means therein for executing the method steps of the invention, a program storage device readable by a machine, tangibly embodying a program of instructions executable by a machine to perform the method steps of the invention, or a computer program product. Such an article of manufacture, program storage device or computer program product may include, but is not limited to, CD-ROMs, diskettes, tapes, hard drives, computer RAM or ROM and/or the electronic, magnetic, optical, biological or other similar embodiment of the program. Indeed, the article of manufacture, program storage device or computer program product may include any solid or fluid transmission medium, magnetic or optical, or the like, for storing or transmitting signals readable by a machine for controlling the operation of a general or special purpose programmable computer according to the method of the invention and/or to structure its components in accordance with a system of the invention.

The invention may also be implemented in a system. A system may comprise a computer that includes a processor and a memory device and optionally, a storage device, an output device such as a video display and/or an input device such as a keyboard or computer mouse. Moreover, a system may comprise an interconnected network of computers. Computers may equally be in stand-alone form (such as the traditional desktop personal computer) or integrated into another apparatus (such a cellular telephone). The system may be specially constructed for the required purposes to perform, for example, the method steps of the invention or it may comprise one or more general purpose computers as selectively activated or reconfigured by a computer program in accordance with the teachings herein stored in the computer(s). The procedures presented herein are not inherently related to a particular computer system or other apparatus.

The required structure for a variety of these systems will appear from the description given.

While this invention has been described in relation to preferred embodiments, it will be understood by those skilled in the art that changes in the details of construction, arrangement of parts, compositions, processes, structures and materials selection may be made without departing from the spirit and scope of this invention. Many modifications and variations are possible in light of the above teaching. Thus, it should be understood that the above described embodiments have been provided by way of example rather than as a limitation and that the specification and drawing(s) are, accordingly, to be regarded in an illustrative rather than a restrictive sense.

The embodiments of the invention in which an exclusive property or privilege is claimed are defined as follows:

1. A method for managing compiler error messages, comprising the steps of:
   displaying a compiler error message having a separate empty error file to a user;
   accepting from said user an annotation to said compiler error message;
   associating said annotation with said compiler error message using a unique key;
   storing said annotation in said separate empty error file; and thereafter selectively displaying said annotation with said compiler error message;
   selecting a compiler error message having a first key from a first file of compiler error messages for display to said user;
   associating in a second file said annotation to said selected compiler error using a second key message in said first file;
   upon presenting a compiler error message from said first file, determining the presence of a corresponding annotation in said second file using said second key;
   responsive to the presence of said corresponding annotation, displaying with said compiler error message indicia representing the existence of said annotation;
   selectively receiving from said user a request to display said annotation; and
   responsive to receiving the request from said user, displaying said annotation with said compiler error message using said second key.

2. An article of manufacture comprising:
   a computer memory executable by a processor having computer readable program code means embodied therein for managing compiler error messages, the computer readable program means in said article of manufacture comprising:
   computer readable program code means for causing a computer to effect displaying a compiler error message to a user having a separate empty error file;
   computer readable program code means for causing a computer to effect accepting from said user an annotation to said compiler error message;
   computer readable program code means for causing a computer to effect associating said annotation with said compiler error message and storing said annotation in said separate empty error file using a unique key;
   computer readable program code means for causing a computer to effect thereafter selectively displaying said annotation with said compiler error message;
   computer readable program code means for causing a computer to effect selecting a compiler error message from a first file of compiler error message for display to said user;
   computer readable program code means for causing a computer to effect associating in a second file said annotation to a corresponding compiler error message in said first file;
   computer readable program code means for causing a computer to effect, upon presenting a compiler error message from said first file, determining the presence of a corresponding annotation in said second file;
   computer readable program code means for causing a computer to effect, responsive to the presence of said corresponding annotation, displaying with said compiler error message indicia representing the existence of said annotation;
   computer readable program code means for causing a computer to effect selectively receiving from said user a request to display said annotation; and
   computer readable program code means for causing a computer to effect responsive to receiving the request from said user, displaying said annotation with said compiler error message.

* * * * *